Figure 1:
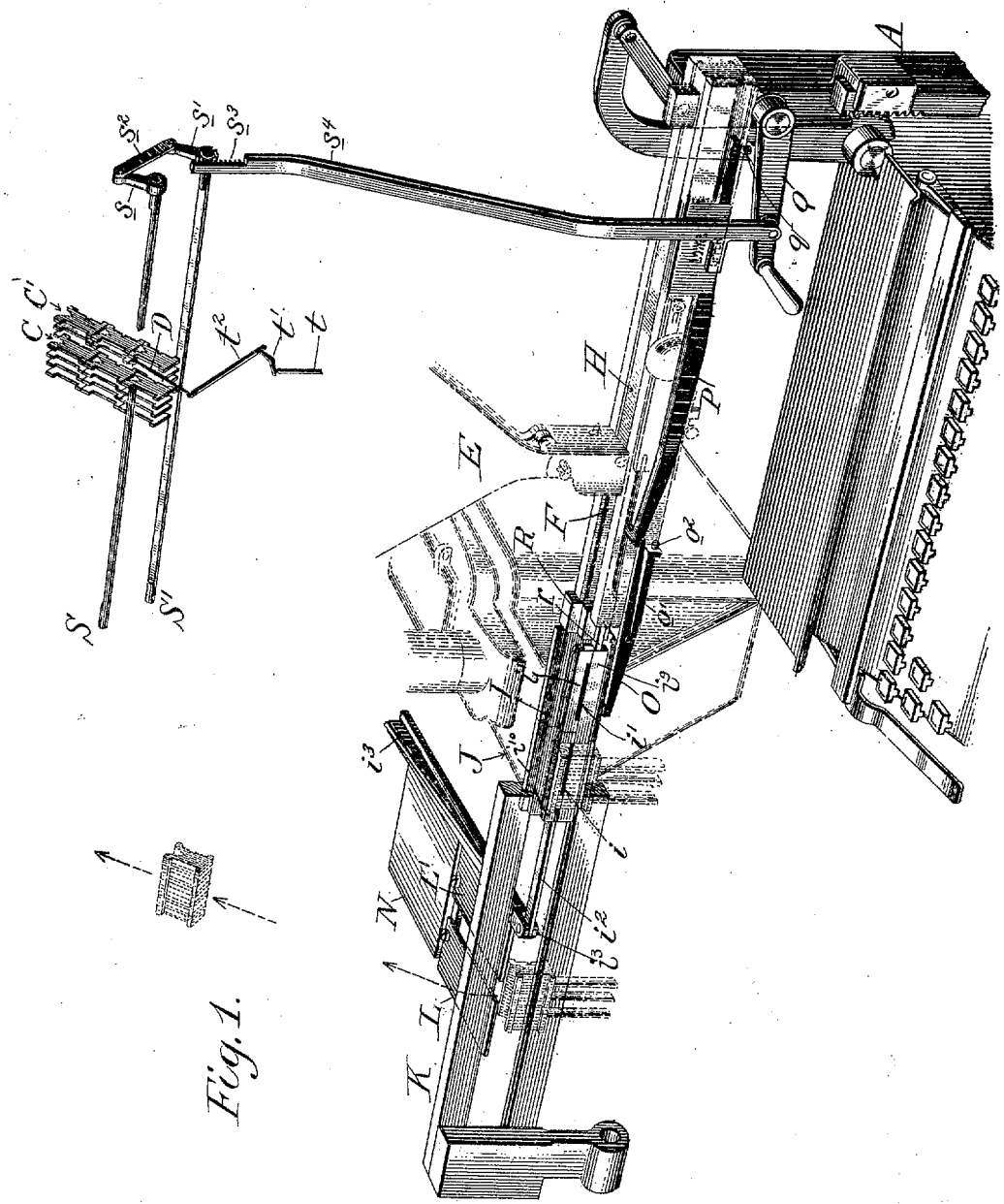

No. 888,786. PATENTED MAY 26, 1908.
F. B. CONVERSE.
LINOTYPE MACHINE.
APPLICATION FILED FEB. 4, 1908.

6 SHEETS—SHEET 1.

Witnesses: Inventor
F. B. Converse
By his Attorney

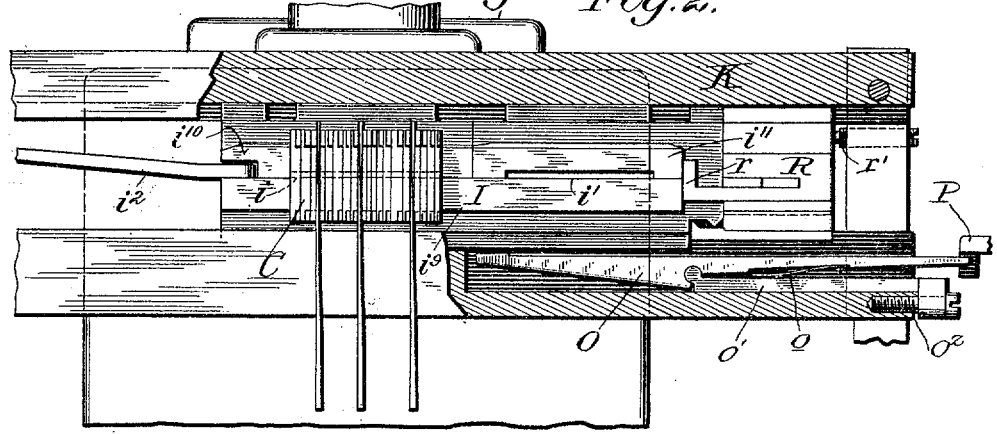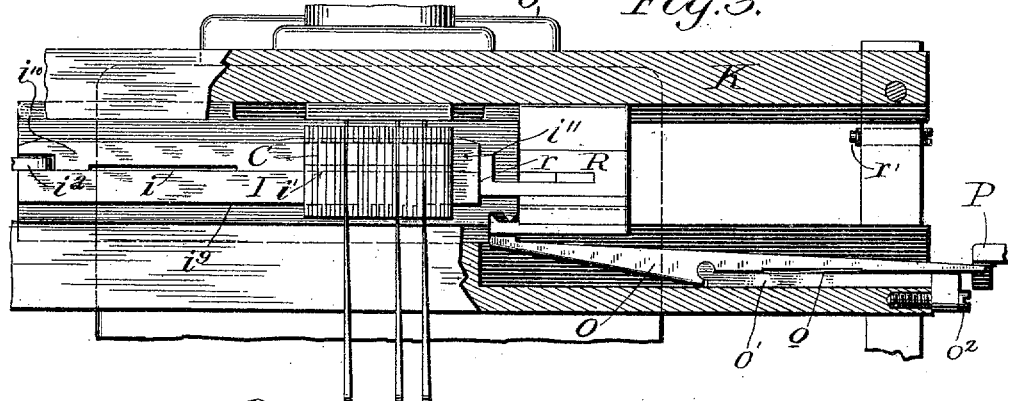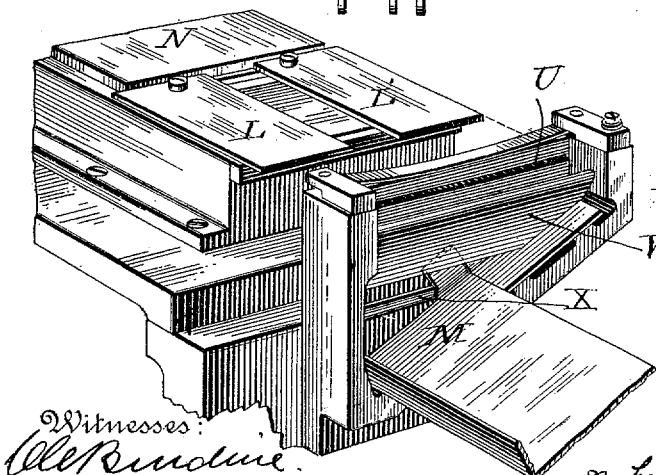

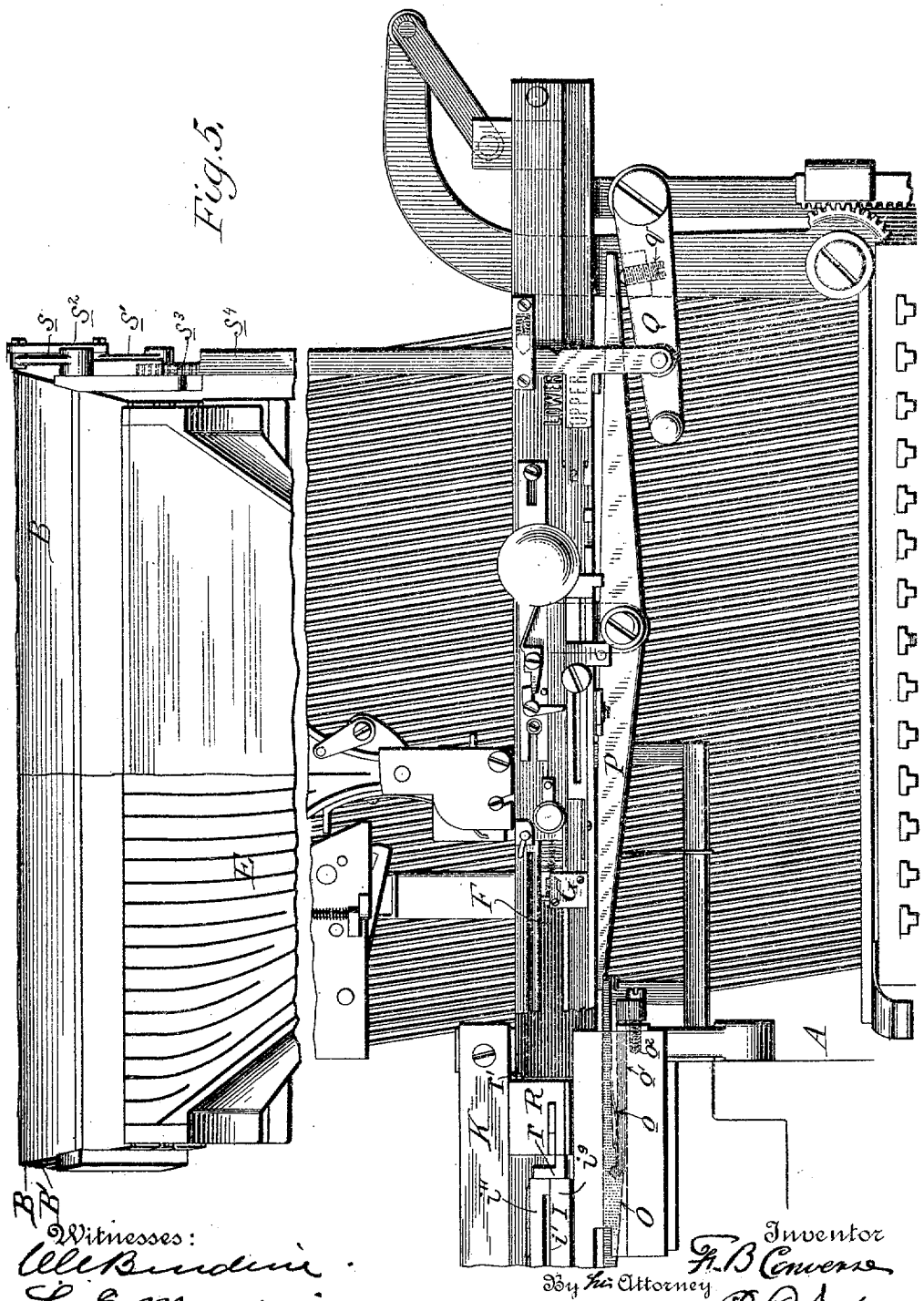

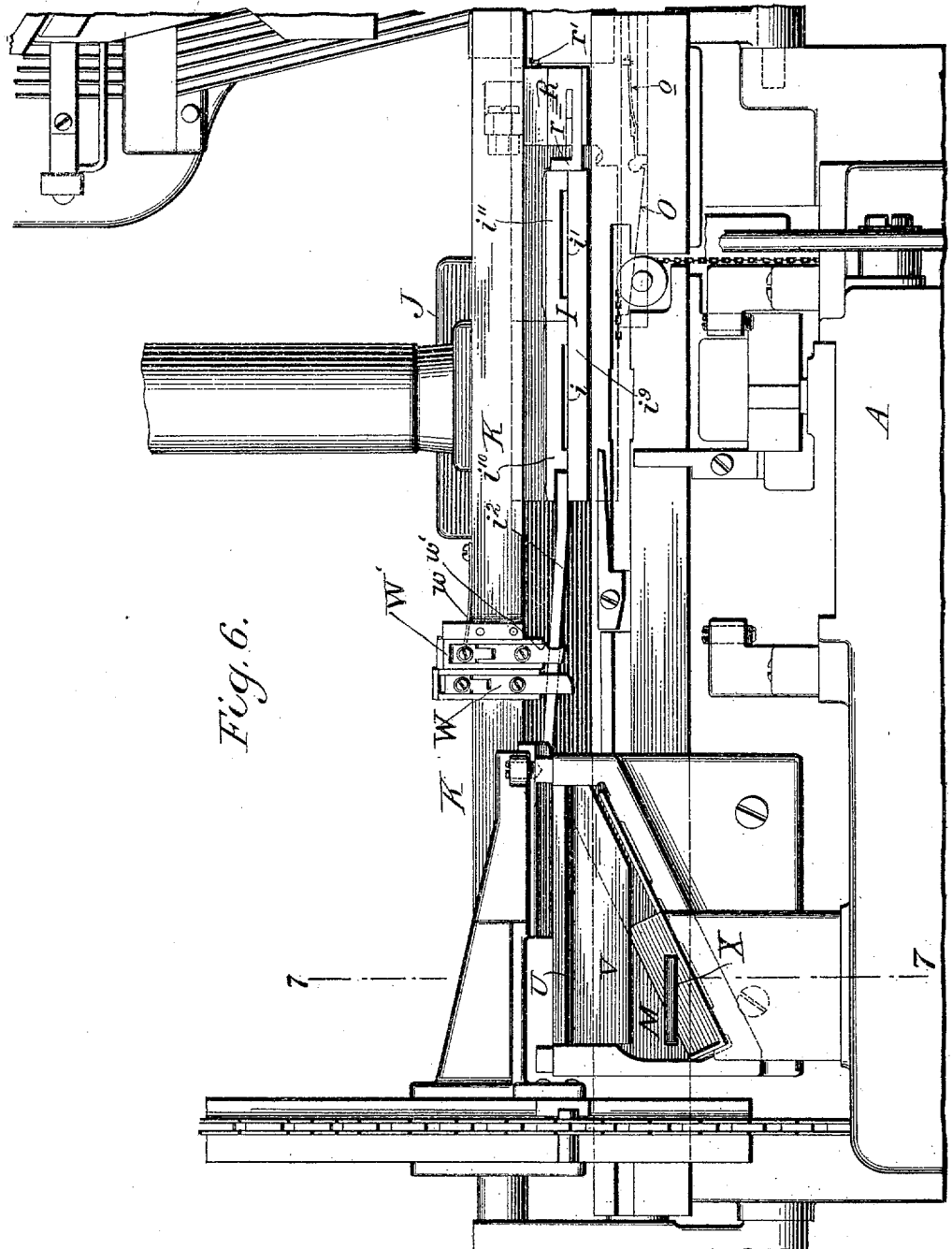

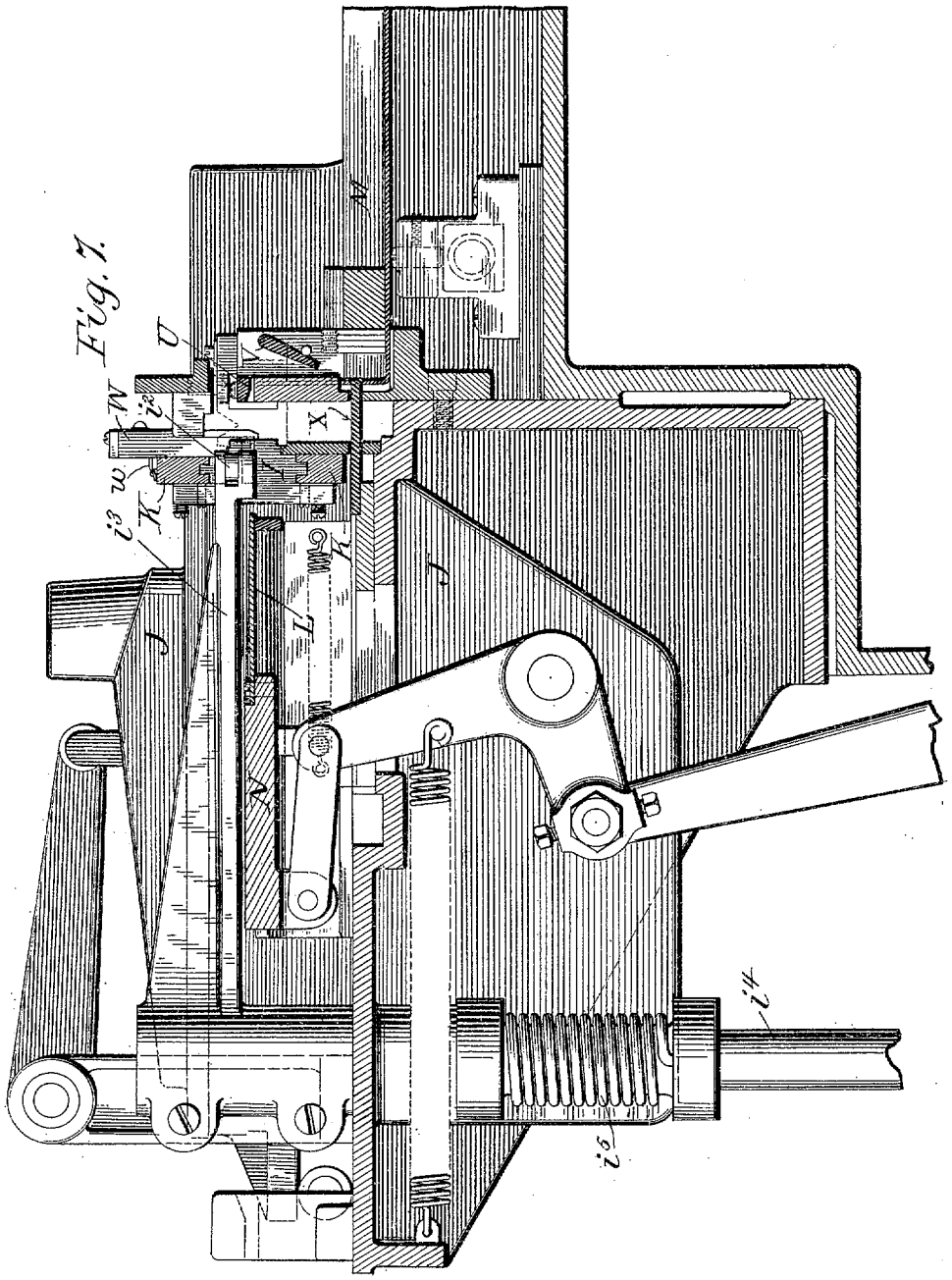

No. 888,786. PATENTED MAY 26, 1908.
F. B. CONVERSE.
LINOTYPE MACHINE.
APPLICATION FILED FEB. 4, 1908.
6 SHEETS—SHEET 6.
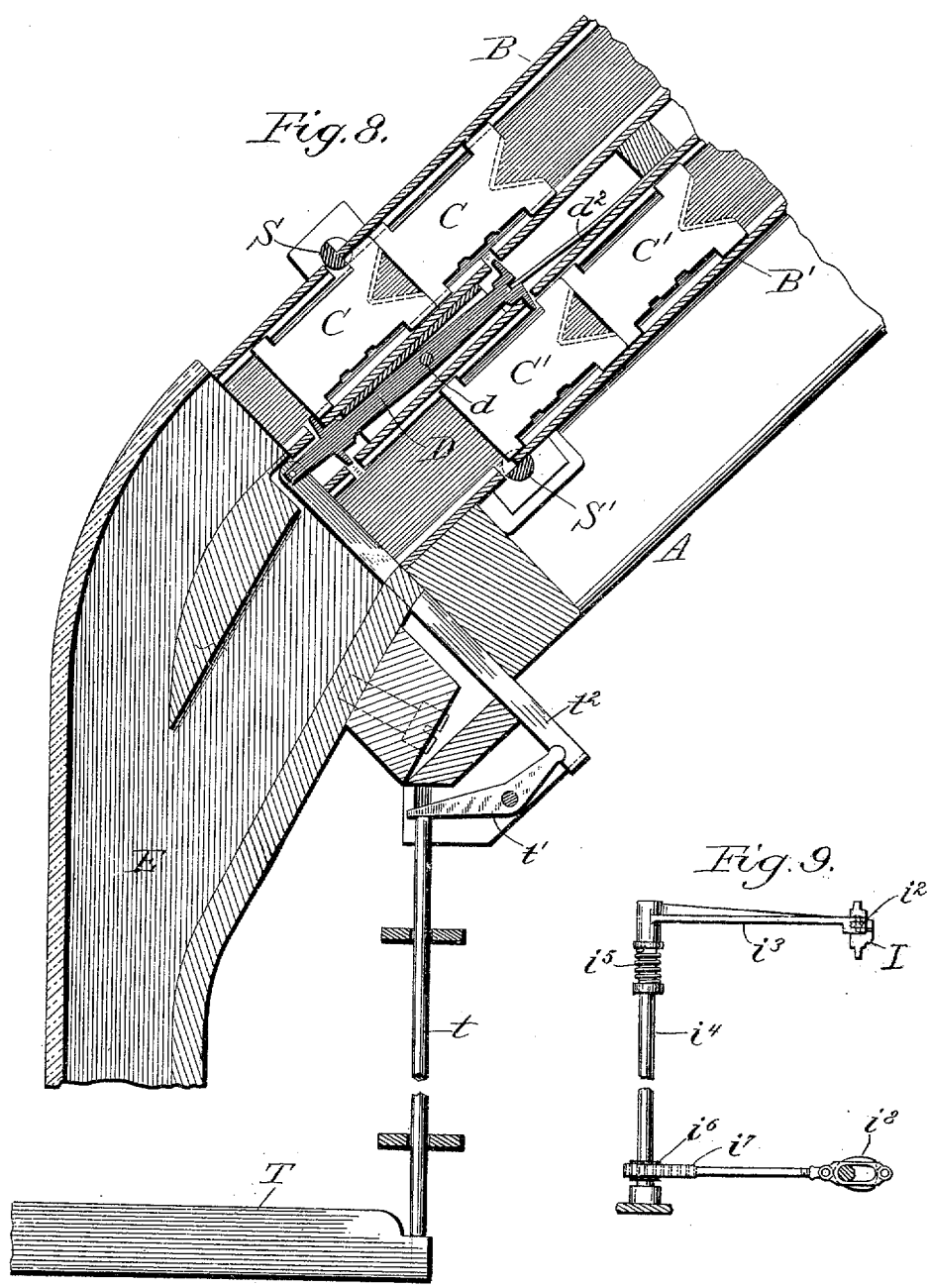

UNITED STATES PATENT OFFICE.

FRANCIS B. CONVERSE, OF BROOKLYN, NEW YORK, ASSIGNOR TO MERGENTHALER LINOTYPE COMPANY, A CORPORATION OF NEW YORK.

LINOTYPE-MACHINE.

No. 888,786.  Specification of Letters Patent.  Patented May 26, 1908.

Application filed February 4, 1908. Serial No. 414,247.

*To all whom it may concern:*

Be it known that I, FRANCIS B. CONVERSE, of the borough of Brooklyn, county of Kings, and State of New York, have invented a new and useful Improvement in Linotype-Machines, of which the following is a specification.

This invention relates to that class of machines in which a line of matrices, temporarily composed by means of finger-keys, is mechanically presented to close the face of a slotted mold, into which molten metal is delivered for the purpose of producing a slug or bar with a justified line of type faces thereon, such machines being commonly known in the art under the trade mark "Linotype." In this class of machines, it is frequently desirable to change the dimensions of the slugs produced, either as to thickness, or length, or both.

The first part of my invention consists in the combination of two or more molds arranged tandemwise, with means whereby either one of these molds may be brought instantly into action at will. Machines of this class are built in various forms with two or more magazines containing unlike fonts or sets of matrices, either one of which may be brought into action at will, in order to produce on the slugs type faces of one class or another.

The second part of my invention consists broadly in combining with the means for bringing the respective molds into action, means for bringing the respective matrix fonts into action, so that the selection of a mold and the corresponding matrices may be effected by a single operation.

The accompanying drawings illustrate my invention as embodied in a machine of the character represented in application for Letters Patent of the United States filed by me on the 9th day of November, 1907, Serial No. 401,412. The drawings herein are limited to those parts with which the invention is immediately associated, but as to all other parts, the machine may be of the construction set forth in the above-named application, or of any other equivalent construction.

In the drawings,—Figure 1 is a perspective view illustrating in outline the casting mechanism, matrix-delivering mechanism, and intermediate parts, constructed in accordance with my invention. Fig. 2 is a front elevation of the pot, the molds and adjacent parts, with the left mold in operative position. Fig. 3 is a similar view with the right mold in operative position. Fig. 4 is a perspective view illustrating the two ejectors and the galley arranged to receive matrices therefrom. Fig. 5 is a front elevation showing principally the parts by which the matrix line is composed or assembled and delivered to the mold. Fig. 6 is a front elevation showing the principal parts of the casting mechanism and the receiving galley mainly located to the left of the parts shown in Fig. 5. Fig. 7 is a vertical section from front to rear through one of the ejectors, the receiving galley and other parts, on the line 7—7, Fig. 6. Fig. 8 is a vertical section from front to rear through the lower end of the magazine, showing more particularly the escapements indicated in Fig. 1. Fig. 9 is a diagram illustrating mechanism by which the molds are reciprocated.

Referring to the drawings, A represents the main frame which may be of any suitable construction.

B and B' are two inclined magazines located one over the other and provided with longitudinal grooves or channels to receive and guide the upper and lower edges of the matrices C and C'.

In the form shown, the circulating matrices and the magazine are essentially the same as those of the commercial Mergenthaler machines. The matrices representing the various characters and spaces are released one at a time from the magazine by intermediate escapements D operated by finger-keys, and hereinafter described in detail.

The released matrices and spaces descend successively through the converging channels E into the assembling-slot or channel F, where they are composed or assembled in line against a yielding resistant G, the successive matrices and the line being crowded forward to the left by a rotary star-wheel, or other packing device, such as described in my previous application. These devices form no part of the present invention.

After the matrix line is composed, it is pushed forward to the left by the manually actuated slide H to the casting position in front of the slotted mold I, which latter, during the casting operation, stands in front of the melting pot J, having a perforated mouth arranged to close the back of the mold and to deliver molten metal into the same in a manner well understood by those skilled in the art.

The mold I is arranged to slide horizontally in a supporting-frame K, so that it may be moved with the contained slug from the position in front of the pot to a position in front of a reciprocating ejector, by which the slugs are delivered from the mold to a receiving galley M at the front.

The reciprocating molds heretofore in use were constructed each with a single slot adapted to produce a single slug or linotype. When change in the size of the slug was demanded, the mold was removed and replaced by another, or its constituent parts re-arranged in new relations to change the size of the slot. Instead of this single mold I employ a mold having two slots of different dimensions arranged end to end, or connected to single molds arranged end to end, so that either mold and slot may be brought into action at will by simply sliding the mold to the proper position.

The details of the mold construction are not of the essence of the invention, the only requirement being that there shall be two mold cells arranged end to end.

In the drawing I represents a mold body containing two horizontal slots or molds proper $i$ and $i'$ extended therethrough from front to rear.

The mold body is mounted to slide in the frame K so that either one of the molds or cells may be brought opposite the pot J to receive metal therefrom, and thereafter advanced to the left so as to present the contained slug in front of the corresponding ejector-blade L or L'. There are two of these blades arranged side by side and detachably secured to a reciprocating mechanically actuated slide N. This slide serves to advance both blades simultaneously through the corresponding molds, one blade acting to expel the slug from the mold which is for the moment in use, while the other blade passes idly through the mold.

It will be observed that under the foregoing construction it is only necessary, in order to change the size of the slug produced, to arrest the return movement of the mold body toward the right, so as to bring one slot or the other in position between the pot and the matrix line. In moving to the left, the mold stops always at the same point, but it is obvious that a single ejector-blade can be used and the mold arrested in position to present one slot or the other in front of the blade. As, however, slugs are most commonly cast of the same length but of different thicknesses, it is preferred to use the two ejectors because it permits instantaneous change in the size of the slug without necessitating a change in the ejectors.

The mold body may be moved to and fro by any suitable mechanism, but I recommend for the purpose an arrangement similar to that shown in my previous machine, and shown in Figs. 1, 7 and 9, the mold being connected by a link $i^2$ to one end of a horizontal arm $i^3$, carried on the upper end of a vertical rock-shaft $i^4$, acted upon by a spiral spring $i^5$, which tends to move the mold toward the right to the casting position.

The return movement of the mold to the ejecting position is effected by a pinion $i^6$ secured to the shaft $i^4$ and actuated by a rack-bar $i^7$ receiving motion from a cam $i^8$ on the main-shaft.

With the foregoing arrangement, the mold is moved positively to the left to the ejecting position, but returned to the right as the cam permits, by the spring $i^5$, which is adapted to carry the mold to or beyond the point at which the left-hand mold slot is in the casting position. In order to limit this movement of the mold to the right so that it may be arrested with one slot or the other in the casting position, I propose to use stop devices of any suitable character under the control of the operator. In the drawing I have shown for the purpose a stop-lever O. This lever may be thrown downward, as shown in Fig. 2, below the path of the mold, so that the latter may pass to the right until the left slot is in the casting position; or its end may be thrown upward, as shown in Fig. 3, in position to arrest the mold with its right slot in casting position. Thus it will be seen that the slug may be cast in one mold cell or the other at will by simply moving the stop-lever O.

The stop-lever O is urged toward the inactive position, shown in Figs. 2 and 5, by an underlying spring $o$. It is thrown into operative position by a lever P centrally pivoted to the frame, with one end overlying the lever O and the opposite end overlying a hand-lever Q, which is pivoted to the frame and provided with a spring-elevated plunger $q$, acting beneath the lever P. When the lever Q is raised, the right mold slot is brought into action, and when it is depressed, the left slot is brought into action.

In order that the mold, when in casting position, may be accurately adjusted endwise with reference to the pot and the matrix line, I prefer to mount the stop-lever O on a horizontal slide $o'$ mounted in the mold-frame and adjustable endwise by means of a screw $o^2$. These devices have the proper adjustment when the right slot is in use. When the left slot is in use, the movement of the mold is limited by a horizontal slide R, which is seated in the mold-guiding frame and arranged to abut against an adjusting screw $r'$, this screw serving to change the position of the slide R and thus locate the end of the mold. This slide and its finger $r$ correspond to those in my original machine, and are used for the purpose of moving the matrix line to the right after the casting operation, in a manner described in said application.

It will be remembered that the slugs driven from the mold by the ejector-blades are received in a galley M. As the respective ejectors deliver the slugs at different points, and as slugs of both sizes are sometimes assembled in the same column or page, I provide means by which all of the slugs are assembled columnwise in the galley, whether delivered by one ejector or the other. To this end I give the galley an inclination downward toward the left, making its receiving end of suitable width to receive the slugs from either ejector.

A horizontally slotted guide U receives the slugs edgewise from the ejectors which drive them forward through and beyond this guide. In front of the guide there is a horizontal plate V on which the forward edges of the advancing slugs are received and supported, so that after the slugs pass the guide U, they will fall footfirst on the plate V, whereby they are caused to assume an erect position as they pass downward from the galley.

Those slugs which are delivered from the left-hand ejector pass directly to their proper positions in the galley, but those which are delivered from the right-hand ejector are received upon the upper or elevated side of the galley, and slide down endwise to their proper positions therein.

After each slug reaches its position, it is moved forward, together with those before it, by a horizontal pusher X, receiving motion from the ejector-slide. This pusher, the guide U and plate V are similar to those shown in my original application, except that they are made of greater width and combined with an inclined galley, so that the slugs received on the upper side of the latter may slide down to their proper positions.

Referring now to the means for automatically bringing into action a different font of matrices when change is made as to the mold in use, attention is directed particularly to Figs. 1 and 5. S and S' represent two horizontal rock-shafts extending through the respective magazines, and each flattened on one side. When turned to present their flattened faces in an upright position, they engage the ears of the lowermost matrices and prevent their escape from the magazine; while, on the contrary, when turned so that their faces lie flatwise in the magazine, the matrices are permitted to pass them when released by the escapements. The two shafts have their flattened faces arranged at right angles to each other, and at one end the shafts are provided with crank-arms $s$ and $s'$ connected by a link $s^2$, whereby they are compelled to turn in unison, so that when the matrices of one magazine are unlocked and free to be discharged, those of the other magazine are retained. The lower crank $s'$ is provided with teeth engaged by corresponding teeth $s^3$ on an upright bar $s^4$ which is pivoted at its lower end to the mold-controlling lever Q. Whenever this lever is moved to bring either mold into action, it acts through the intermediate parts to turn the shafts S and S' and unlock the font of matrices corresponding to such mold, the other font being at the same time locked out of action. Thus it is that the bringing of one mold or the other into use is caused to bring into use the corresponding matrices.

It will be noted that the stop-lever O is moved in both directions by springs, thereby permitting the hand-lever to be operated at any time irrespective of the position of the mold. The stop-lever being in engagement with the mold at the moment of manipulation of the hand-lever, retains such engagement until the mold travels to the left, whereupon the stop-lever springs into position to locate the mold for the casting of the next line.

The escapement devices for releasing the matrices from the magazines, may be of any appropriate construction, various mechanisms for discharging matrices from one or the other of two magazines at will being already known in the art. I recommend, however, as peculiarly adapted for the present purposes, the form of vibratory escapement shown at D in Figs. 1 and 8. These escapements consist each of a single piece or lever seated between the upper and lower magazines on a horizontal pivot $d$ at the middle. On the upper side, near opposite ends, this escapement has two lips which alternately enter the lower side of the upper magazine, and on the under side, near opposite ends, the escapement has two corresponding lips which alternately enter the lower magazine. The magazines are provided with slots or openings for these lips, and the lips are made of such form and size that they will project into the magazine sufficiently to engage the matrices therein.

It will be observed that the escapement engages two matrices in the respective magazines at one time, the engagement being at opposite ends of the escapement. When the position of the escapement is reversed, it will unlock the two matrices and engage others. Although matrices are unlocked in both magazines at one time, it will be understood that they are permitted to escape only from that magazine which has its locking bar in proper position.

The escapement is held normally in the position shown in Fig. 8 by a spring $b^2$. The position is reversed by a key-lever T acting through a sliding rod $t$ and a lever $t'$ pivoted to the frame and acting on a slide $t^2$ which connects with the escapement.

During the casting operation, the metal will frequently overflow slightly between the face of the mold and the edges of the matrices, producing thin fins along the edges of the slugs. To effect the removal of these fins, I attach to the mold-guiding frame K two knives W and W', the former having a cutting lip to ride against the face of the mold and along the lower edge of the slug, and the latter having a lip to ride against the face of the mold and along the upper face of the slug. The lower side of the mold-slot is unchangeable in height, and therefore the knife W requires no vertical adjustment. As, however, the top of the mold is variable so that slugs of different thicknesses will present their upper sides at different heights, the knife W' is arranged to slide vertically and is urged downward by a spring $w$. The knife is made with a shoulder $w'$, adapted to ride on the horizontal upper surface or shoulder of the mold-cap, so that each mold in passing, determines the height of the knife. In other words, each mold automatically adjusts the upper knife so that it will properly trim along the upper edge of the slug whatever the thickness of the latter may be.

It is obvious that any other finger-key connections, many of which are known in the art may be substituted.

I believe the present to be the first instance in which two molds arranged tandemwise have been movable at will without changing their relations, so that either one may be brought to the casting position. I also believe the present to be the first instance in which two molds have been combined with means for moving them, and with means by which either one may be instantly brought at will to a common casting position. I also believe the present to be the first instance in which two molds and two fonts of matrices have been combined with means by which either mold and the corresponding matrices may be brought into action at will. I also believe it to be the first instance in which two reciprocating molds have been combined with spring-mechanism for advancing them toward the casting position and adjustable stop-devices for arresting them in one position or another, as required.

It will be understood by the skilled mechanic that the details of construction and the arrangement of parts may be widely modified without changing the principle of action or passing beyond the limits of my invention.

The mold I, as shown in the drawings, is in effect a double mold, or in other words, a single structure containing two molds or slots. It consists of a single base portion $i^9$, and two cap portions $i^{10}$ and $i^{11}$ secured thereon end to end, each cap portion having its under side cut away for a part of its length to form the slot or mold proper. These cap portions, which may be secured by screws or otherwise, are independently removable, so that either may be replaced by a cap containing a cavity or mold of different size.

Instead of using a single base member, it is of course obvious that two complete single molds, built in any appropriate manner, may be joined end to end by any suitable connections.

The term mold as used herein, is intended to include a structure containing a single slot or cell, unless otherwise specified.

I am aware that it is old to use in a line-casting machine the single mold arranged to reciprocate endwise from the casting to the ejecting position, and also that it is old to provide a line-casting machine with two identical molds arranged end to end and operated in such manner that both molds are filled at each operation of the machine to produce simultaneously two similar slugs. I believe it to be wholly new, however, to use in an organized line-casting machine, end to end, two molds of different dimensions in connection with means adapted to move both molds to and from the casting position, and means instantly controllable by the operator to bring either mold into action at will to the exclusion of the other, so that the machine may be caused at any instant to produce slugs of one size or the other.

Having described my invention, I claim and desire to secure by Letters Patent,—

1. In a line-casting machine, two slotted molds arranged tandemwise, in combination with means for moving both molds to and from the casting position, and means controllable by the operator at will for causing the presentation of either mold in the casting position to the exclusion of the other; whereby the machine may be caused to produce slugs from either of the molds alone at will.

2. In a line-casting machine, means in a fixed location for delivering molten metal to one mold at a time and means for ejecting the slugs from the molds, in combination with two molds of different dimensions arranged tandemwise, means for reciprocating both molds endwise from the casting to the ejecting position, and means controllable at will by the operator for bringing either mold into action to the exclusion of the other.

3. In combination, two reciprocating molds, a pot adapted to coöperate with one mold at a time, mechanism for carrying the two molds to the pot, and manually operated devices to determine the stoppage of one mold or the other at the pot at will.

4. In a line-casting machine, the combination of a melting pot arranged to deliver molten metal, two molds of different dimensions, mechanism for carrying the molds successively to the pot, and controllable means for causing the stoppage of one mold or the other at the pot.

5. In a line-casting machine, the combination of two molds arranged tandemwise, means for reciprocating said molds to and from the casting position, and manually controlled devices for causing the stoppage of either mold at will at the casting position.

6. In a line-casting machine, a mold, spring-actuated means for advancing the mold to the casting position, means for retracting the mold from the casting position, and manually operative means to arrest the mold at the casting position.

7. In a line-casting machine, two reciprocating molds of different dimensions arranged tandemwise, means for advancing said molds to the casting position, manually operative means for arresting one mold or the other at the casting position, and means for retracting the molds from the casting position.

8. In combination with the melting pot, two reciprocating molds arranged tandemwise, a spring-actuated arm to advance the molds toward the casting position, mechanism for moving said arm to retract the molds, and means for arresting the molds in two positions; whereby either mold may be caused to stop at the casting point.

9. In combination with two variant molds, two magazines each containing a set or font of matrices, controllable means for causing the presentation of one mold or the other at the casting position, and means connected therewith for determining the delivery of matrices from one magazine or the other; whereby the bringing of either mold into use insures the delivery of matrices from the corresponding magazine.

10. In a line-casting machine, two variant molds, two magazines containing matrices to coöperate with the respective molds, and intermediate means, whereby the placing of either mold out of action prevents the delivery of the corresponding matrices.

11. In combination, the two reciprocating molds, stop device O, the connected matrix-controlling shafts S, S', and a connection between said stop device and shafts; whereby each set of matrices is caused to work in connection with the corresponding mold.

12. In combination with two movable molds, two corresponding ejectors, means for delivering metal to the molds one at a time, and controllable means for causing either mold to be presented to the casting position and thence to the ejecting position.

13. In a line-casting machine, in combination, two variant traveling molds, two corresponding ejectors simultaneously operative, a melting pot adapted to deliver metal to one mold at a time, and controllable means for presenting either mold at will to the pot and moving it thence to the corresponding ejector; whereby slugs of different sizes may be produced and delivered at will.

14. In a line-casting machine, two magazines, means for permitting the delivery of matrices from either magazine at will, and intermediate escapements each consisting of a lever having oppositely projected lips at each end to enter the respective magazines, said levers having their axes at right angles to the line of travel of the matrices.

15. In a line-casting machine, two magazines and intermediate escapement levers having their ends adapted to enter both magazines, and their axes at right angles to the paths of the matrices.

16. The escapement for a line-casting machine, consisting of a lever having at the middle a transverse axis, and at each end two lips projecting in opposite directions.

17. In combination with a traveling mold, a stop-device to determine its operative position, said stop being spring-actuated, substantially as described; whereby it may be set for action in advance, and caused to spring automatically to its operative position after the passage of the mold.

18. In a linotype machine, two molds adapted to cast slugs of different thicknesses, in combination with a spring-actuated knife arranged to coöperate with both molds, and controlled as to its operative position by each mold; whereby the knife is automatically adjusted to trim slugs of different thicknesses.

In testimony whereof I hereunto set my hand this 18th day of January, 1908, in the presence of two attesting witnesses.

FRANCIS B. CONVERSE.

Witnesses:
DAVID S. KENNEDY,
ROBERT G. CLARK.